United States Patent [19]
Brown

[11] Patent Number: 6,122,258
[45] Date of Patent: Sep. 19, 2000

[54] METHOD FOR CREATING A NUMBERING PLAN-INDEPENDENT DIRECTORY STRUCTURE FOR TELECOMMUNICATIONS APPLICATIONS

[75] Inventor: Anne R. Brown, Kanata, Canada

[73] Assignee: Nortel Networks Corporation, Montreal, Canada

[21] Appl. No.: 08/921,013

[22] Filed: Aug. 29, 1997

[51] Int. Cl.[7] .................................................. H04L 12/28

[52] U.S. Cl. .............................. 370/256; 707/200; 707/10

[58] Field of Search ............................ 370/256; 379/200, 379/94, 207, 220, 221; 364/252, 222; 707/200, 10

[56] References Cited

U.S. PATENT DOCUMENTS

| | | | |
|---|---|---|---|
| 4,747,127 | 5/1988 | Hansen et al. | 379/94 |
| 5,311,584 | 5/1994 | Bogart et al. | 379/220 |
| 5,483,652 | 1/1996 | Sudama et al. | 395/364 |
| 5,491,817 | 2/1996 | Gopal et al. | 395/364 |

OTHER PUBLICATIONS

Paper entitled "Address Resolution for Voicemail Systems—X.500 Methodology", Data Connection Ltd., Sep. 16, 1996.

*Primary Examiner*—Michael Horabik
*Assistant Examiner*—Prenell Jones

[57] ABSTRACT

A numbering plan-independent directory structure for telecommunications applications is described. Common directory services permit users to easily and transparently use telecommunications services such as sending multimedia messages to recipients on different multimedia messaging systems, using the recipients preferred supported capabilities. For example, sending messages may be difficult if the sender does not have an address or other profile information of the recipient. A sub-tree structure which is numbering plan-independent provides a mechanism to eliminate global searching for telecommunications information. A sub-tree is defined in the directory, the sub-tree having a structure in which each alphanumeric character of the unique identifier comprises a separate node in the sub-tree. The advantage is the enablement of information location where information can be retrieved without a search given a known unique identifier such as a telephone number.

21 Claims, 3 Drawing Sheets

METHOD FOR CREATING A NUMBERING PLAN-INDEPENDENT DIRECTORY STRUCTURE FOR TELECOMMUNICATIONS APPLICATIONS

TECHNICAL FIELD

This invention relates to methods that facilitate information retrieval from a global or smaller focus directory for telecommunications services, and, in particular, to a method for creating a sub-tree structure for a directory which permits locating without a search, information about an object with an entry in the directory using a telephone number or other unique identifier in the form of a sequence of alphanumeric characters, e.g. a number that is formatted in accordance with a numbering plan.

BACKGROUND OF THE INVENTION

Computerized directories are designed to facilitate communication between, with or about real world objects such as people, organizations, printers, application processes and distribution lists. For example, a directory can be used to determine a person's telephone number, as long as some other information about that person is known. Directories generally consist of a collection of information about real world objects and telecommunications services. International standards have been developed to specify how data in a directory can be accessed, retrieved, modified, protected, replicated and distributed across systems. Such standards include X.500 and Light-Weight Directory Access Protocol (LDAP). For the purposes of this invention, it is only important that data about objects be stored in a directory with a hierarchical structure that can be accessed using LDAP.

A geographically dispersed combination of directory servers can cooperate to support a global tree structure. Alternatively, directories can connect to form separate islands of data. Users of the directory, including people and application processes, can interactively access a directory server with the assistance of application processes designed to facilitate such access.

Each directory object is represented by an entry (node) in the directory. Each entry has one or more attributes associated with it. For example, an entry pertaining to a person object may have an attribute of telephoneNumber=+1 603 123 4567.

As noted above, users of the directory include application processes. Application processes such as voice messaging systems (VMSs) are widely used and there has been considerable interest expressed in enabling VMSs to send voice messages over the Internet to an Internet mail address. Consequently, it would be advantageous for application processes like VMSs to have a mechanism for converting a person's telephone number into an alternate address such as an Internet mail address using a directory.

The Voice Messaging Committee of the Electronic Messaging Association has defined a method for mapping from telephone number to Internet mail address for use by VMSs. An EMA document (Address Resolution for Voice Mail Systems: X.500 Methodology) proposed a way to use the X.500 Directory services to map from a telephone number to an Internet mail address. The voice messaging directory described in that document includes a sub-tree structure that accords with the components of the North American Numbering Plan (NANP). The sub-tree is therefore structured with a country code, area code, exchange and local number. While this sub-tree structure is useful for VMS users in North America, it does not easily permit a global messaging service without knowing all dial plans used by all the countries in the world.

At this time, there is no global directory available for locating objects without a search using telephone numbers or any other unique identifier consisting of alphanumeric sequence of variable length.

It is desirable that users of a VMS be able to transparently dispatch voice mail messages by Internet electronic mail to recipients served by telephone numbering plans other than the NANP. To date, no method of creating a directory structure for accommodating such transparent addressing has been disclosed.

It is also desirable to provide a method of creating a directory structure which will accommodate other unique identifiers which consist of variable length alphanumeric sequences. Such a sub-tree structure would facilitate data retrieval without a search using unique identifiers developed for Intelligent Network (IN) services such as calling card, personal communications and telephone mobility, Internet-based services and telephone directory assistance services.

It is further desirable to provide a method of creating a directory structure which permits and facilitates the use of "numbers for life" and globally portable telephone numbers, and permits objects to be located using such numbers without the necessity of a search.

SUMMARY OF THE INVENTION

It is an object of the invention to provide a method for structuring a directory to provide telecommunications service with numbering plan-independent access without search to a directory entry using a unique identifier consisting of an alphanumeric sequence associated with the entry.

It is a further object of the invention to minimize the numbering plan knowledge required by an application process to avoid a search operation to locate information regarding an object given a unique alphanumeric sequence associated with the object.

It is yet another object of the invention to provide a method for structuring a directory which will support global telephone number portability.

It is yet a further object to the invention to provide a method for structuring a directory which will support access without search to a directory entry associated with a number for life.

It is yet a further object of the invention to provide a method of structuring a directory which accommodates any numbering plan for any application regardless of the length or organization of its numbering scheme.

It is a further object of the invention to provide a method of creating a sub-tree structure for a directory to support the exchange of voice messages over the Internet.

These and other objects are realized in a method for structuring a directory to provide a telecommunications service with numbering plan-independent access without search to a directory entry using a alphanumeric sequence associated with the entry, comprising the steps of:

defining a sub-tree in the directory, the sub-tree having a structure in which each alphanumeric character of the sequence comprises a separate node in the sub-tree; and each leaf node in the sub-tree stores information about the object that is useful to the telecommunications service or is assigned an alias which points to information about the object held somewhere else in a database which stores the entry or to a different database.

The invention therefore provides a method for structuring an information directory such as an information directory which adheres to a hierarchical structure. The sub-tree structure is intended for use by telecommunications services such as voice messaging and other global or enterprise-wide multimedia application processes. Such directory structures can be accessed using, for example, a protocol such as LDAP for access to X.500 and other directories. LDAP eliminates some of the complexity of X.500 Directory Access Protocol (DAP), to permit a lower cost of entry into the directory access client product development. LDAP has been widely accepted by industry and is supported by all major X.500 product and proprietary directory servers.

The directory structure in accordance with the invention has potential for use in telephone directory assistance, IN-based applications such as mobility and calling card, as well as voice messages over the Internet. It also supports global applications such as Internet-based services, directory assistance, global telephone number portability and number for life.

BRIEF DESCRIPTION OF THE DRAWINGS

The invention will now be explained by way of example only and with reference to the following drawings wherein.

DETAILED DESCRIPTION OF THE PREFERRED EMBODIMENT

In order to enable global multimedia telecommunications services, it is advantageous to be able to use some known information such as a unique number to locate an address of an alternate delivery medium for an intended recipient. The unique number may be any unique alphanumeric sequence such as a telephone number, or the like. In order to permit users to easily and transparently send multimedia messages to recipients on the same or on different multimedia messaging systems using the recipient's preferred delivery method, directory services for converting the known identifier such as the recipient's telephone number into an alternate address is the preferred solution. Such directory services are also valuable for locating information about the recipient's supported capabilities such as the preferred delivery method, message formats it supports, etc. A problem arises, however, because numbering plans administered by a plurality of regulatory authorities generally do not adhere to a standard format. Telephone numbering plans, for example, do not conform to a global standard. A directory sub-tree structure is therefore required that will permit an object in a global or smaller scale directory to be located without a search using a unique alphanumeric sequence. A global search, using existing X.500 and LDAP naming schemes, for a person's electronic mail address using a telephone number could take a very long while to complete. This invention provides a directory sub-tree structure which permits an object to be located without search using a unique identifier.

The invention is described below by way of example with reference to telephone numbers but it should be understood that it will support the use of any alphanumeric sequence which uniquely identifies an object in a directory, such as a calling card number, a private dial plan number, a mobility number or any other unique identifier consisting of an alphanumeric sequence. It should also be understood that the directory structure in accordance with the invention can be used to support global applications such as number for life and global telephone number portability as well as Internet-based applications and telephone directory assistance.

Figure 1:
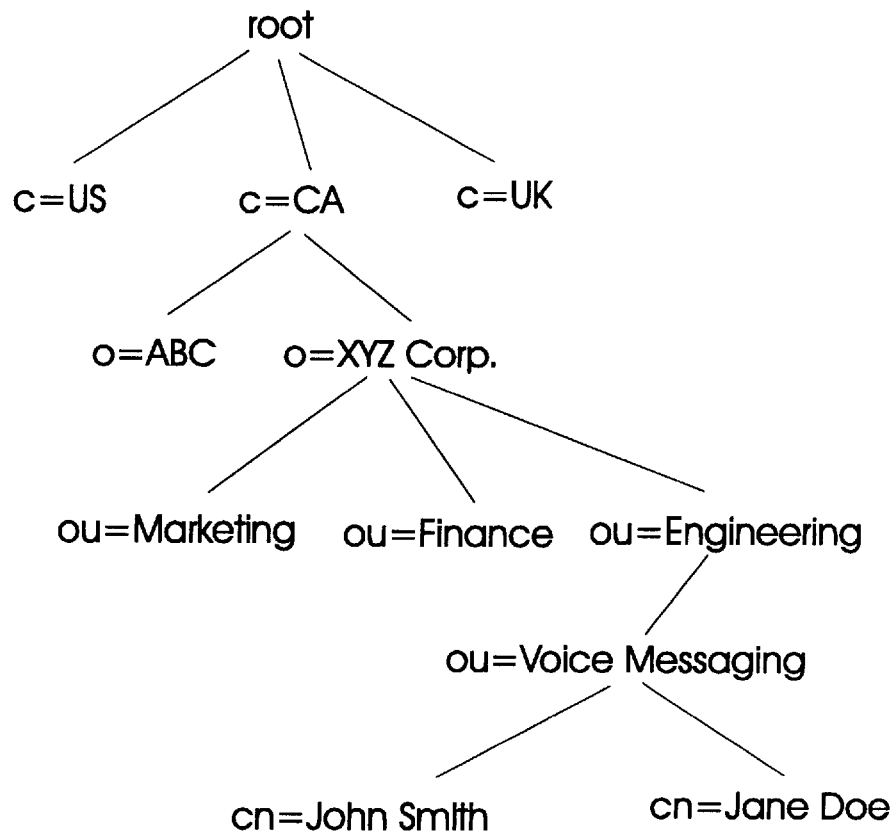
FIG. 1 is a diagram showing a sample Directory Information Tree structure for information stored in a corporate directory.

Directory information is structured hierarchically into a Directory Information Tree (DIT). FIG. 1 shows a sample DIT. The Directory is intended to be a part of a global tree but can also be used on a smaller scale.

Figure 2:
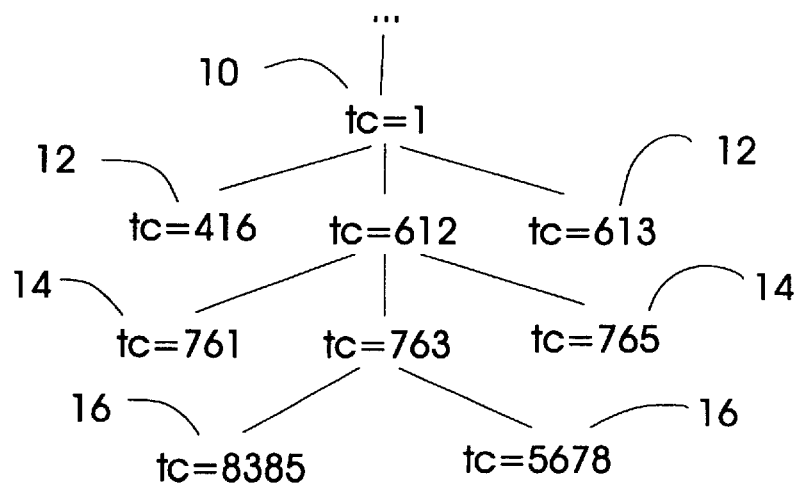
FIG. 2 is a sample NANP aliases sub-tree in accordance with the prior art.

FIG. 2 shows a prior art directory sub-tree structure adapted to accommodate telephone numbers of the North American Numbering Plan (NANP). The sub-tree includes a node 10 which stores the country code digit, nodes 12 which store area code digits, nodes 14 which store exchange digits and nodes 16 which store local number digits. While this sub-tree structure is useful for the telephone number subset included in the NANP, it is not adapted to accommodate the millions of other telephone numbers in use today in other countries and/or private dialling plans, and the like.

Figure 3:
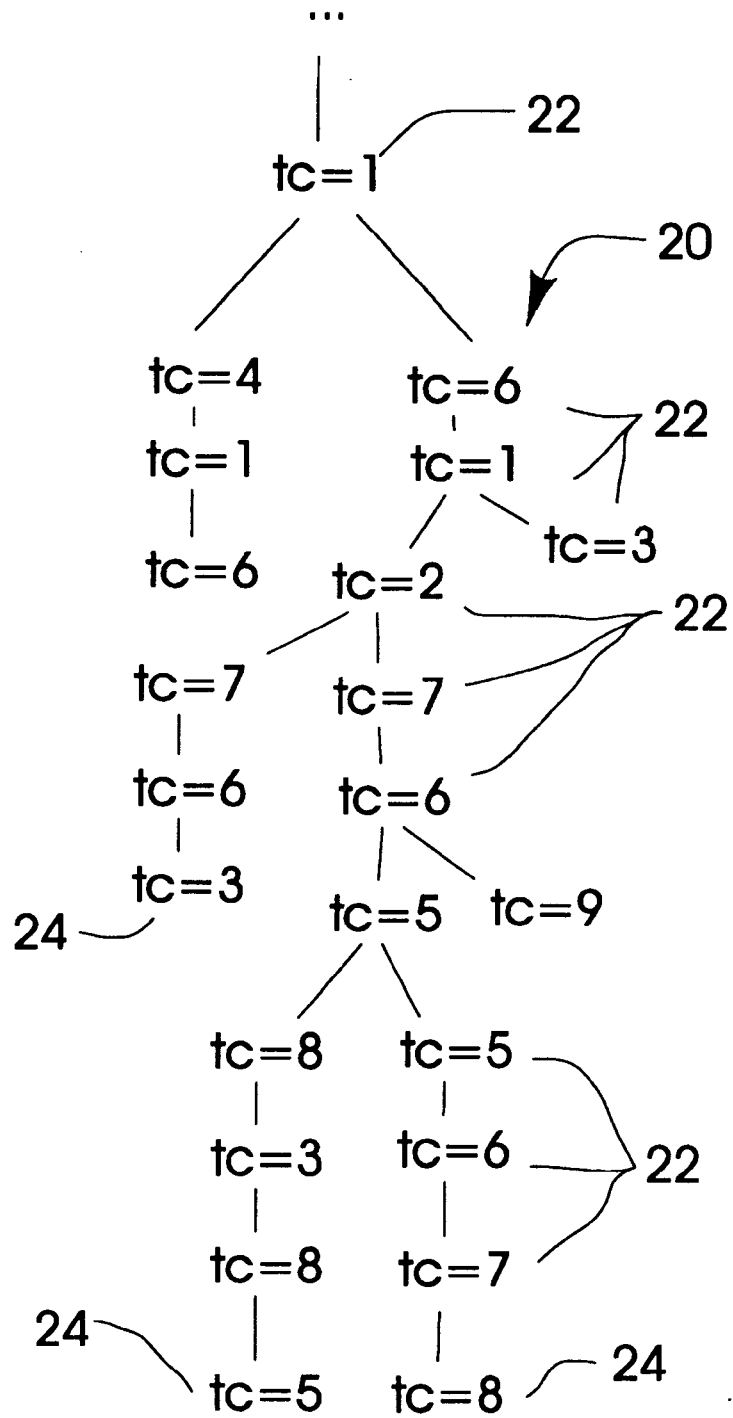
FIG. 3 shows a sub-tree structure in accordance with the invention.

FIG. 3 shows a preferred directory structure in accordance with the invention. The structure includes a sub-tree 20 in which each node 22 stores one digit of a unique number associated with an object having an entry in the directory. The unique number may be a telephone number, for example, as described above. Each leaf node 24 in the sub-tree stores information useful to a telecommunications process or application that uses the directory, or it is assigned an alias which points to the information in another location in a database that stores the directory, or in another database, in a manner well known in the art.

Figure 4:
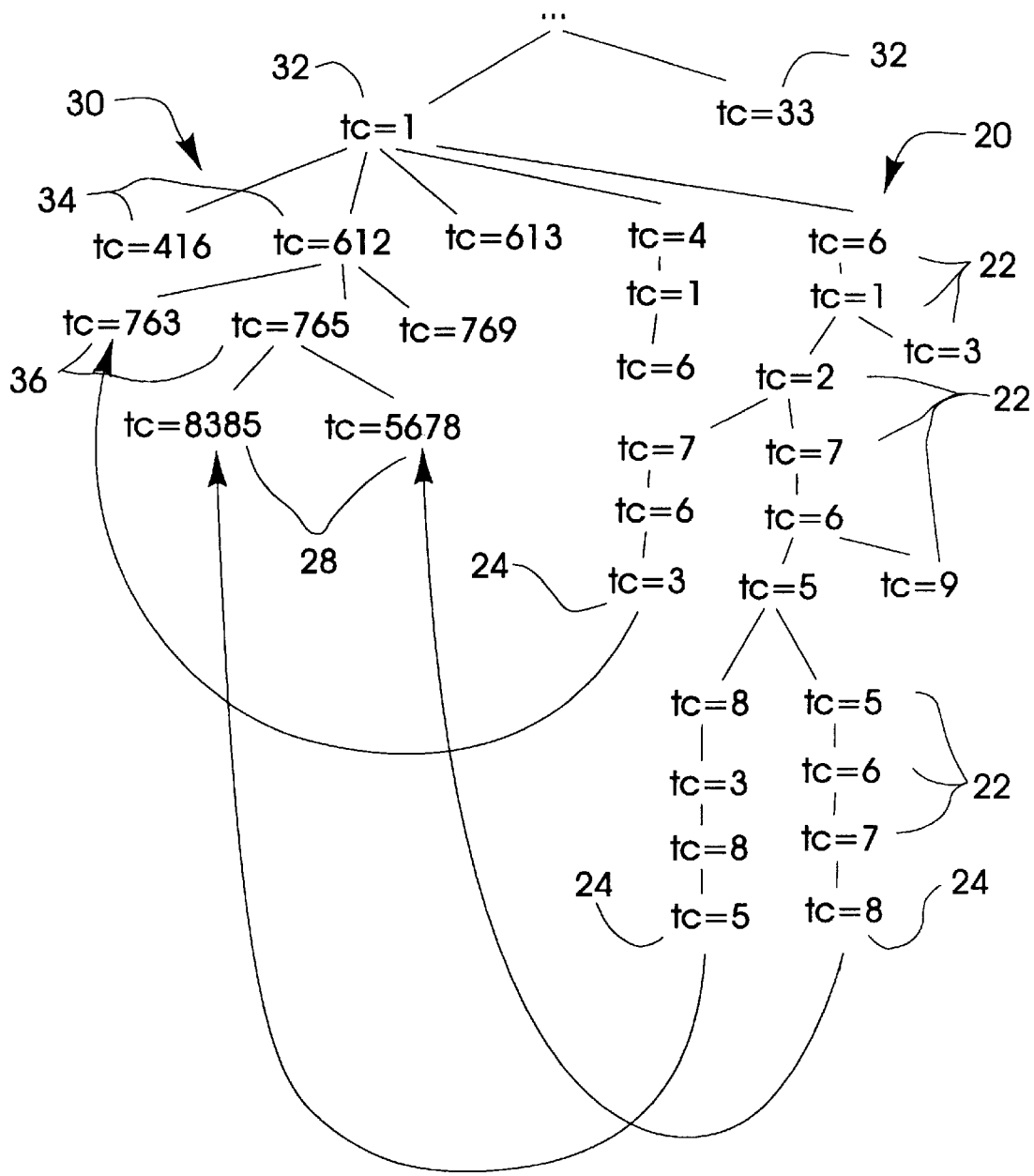
FIG. 4 shows another example of a sub-tree structure in accordance with the invention.

Another structure for the telephone numbering plan-independent sub-tree in accordance with the invention is shown in FIG. 4. This structure includes a first sub-tree, hereinafter referred to as the "long sub-tree" generally indicated by reference 20 which has a structure of a sub-tree in accordance with the invention. It also includes a second sub-tree 30 having a structure that resembles the structure of the numbering plan of the identifier for the object with which the directory entry is associated, an NANP telephone number in this example. The second sub-tree generally indicated by the reference 30, is hereinafter referred to as the "short sub-tree". The long sub-tree has the structure in which each digit of the telephone number is stored as a separate node 22, 32 in the sub-tree. It should be noted that the digit "tc=1" is a part of each of the long and short sub-trees. Leaf nodes 24 in the long sub-tree 20 may contain information or aliases which point to a corresponding leaf node 28, 36 in the short sub-tree 30, which has a structure that more closely resembles the numbering plan to which the telephone number of the object belongs. This structure also permits an application process to locate any telephone number, regardless of the numbering plan to which it belongs. If the application process is knowledgeable of the numbering plan to which the number belongs, it can read the directory using the short sub-tree 30. If, however, it is not knowledgeable of the numbering plan to which the number belongs, it can read the long sub-tree 20 and, using the aliases associated with the leaf nodes 24 in the long sub-tree locate an entry in the short sub-tree 30. The nodes 34 shown in the short sub-tree 30 are arranged to accommodate numbers in the NANP. Therefore, nodes 32 store country codes, notes 34 store area codes, nodes 36 store exchange codes and leaf nodes 28 store local numbers. It will be appreciated by those skilled in the art that other numbering plans stored in a sub-tree structure in accordance with this alternate directory structure require a short sub-tree 30 with a different structure, but the principle remains the same. The short sub-tree 30 provides information about the structure of the numbering plan to which the telephone number belongs and information useful to a telecommunications application process or aliases that point to the information. Either of the sub-tree structures shown in FIGS. 2 or 3 permit a directory service user to locate an object in the directory using a unique alphanumeric sequence without requiring a search.

The naming attributes and structural rules for structuring a voice messaging directory in accordance with a preferred embodiment of the invention will now be explained.

Table 1 shows the sub-tree entry naming attributes used in accordance with the preferred embodiment of the invention.

TABLE 1

| Attribute | OID | Abbreviation | Length |
|---|---|---|---|
| vPIMDigit | id-vpim-at 1 | tc | 30 |
| vPIMrfc822Mailbox | id-vpim-at 2 | | 256 |
| commonName (defined in X.520) | 5.4.3 | cn | 64 |
| spokenName | id-vpim-at 3 | | 4,000 |

The vPIMDigit attribute type is proposed for naming entries comprising the alphanumeric characters (long sub-tree nodes 22, 24) that make up a telephone number (e.g., country code, routing code, area code, local number and extension) in a voice messaging directory sub-tree.

The abbreviation for vPIMDigit is tc.

The attribute vPIMrfc822Mailbox stores the SMTP address of a voice mailbox. It is defined as a distinct attribute to distinguish it from the rfc822Mailbox attribute that may be used for other purposes. Although it would be preferable to define vPIMrfc822Mailbox as a subtype of rfc822Mailbox, it is defined as a new attribute because some directory servers do not support subtyping.

It is assumed that in future implementations, Directory Context will be used to distinguish the voice messaging value of rfc822Mailbox from other uses of the rfc822Mailbox attribute type in X.500 implementations. Similarly, in LDAP an Attribute Description can be used.

The attribute commonName, defined in X.520, stores the values of text name.

The spokenName attribute is an octet string and should be encoded in G.721. This attribute stores a person's name in the voice of that person.

The object classes for the sub-tree structure in accordance with the invention are shown in Table 2.

TABLE 2

| Object Class | OID | Kind | Attributes |
|---|---|---|---|
| vMNode | id-vpim-oc 1 | structural | Mandatory: tc |
| vMUser | id-vpim-oc 2 | auxiliary | Optional vPIMrfc822Mailbox commonName spokenName |

Structural object classes are used in defining the hierarchical structure of the directory tree. vMnode is the structural object class that will be used in defining the structure of the voice messaging directory sub-tree. All entries of this type must contain the tc attribute which is used to name entries in the voice messaging directory sub-tree.

An auxiliary object class is used to group related attributes which can be applied to several types of entries. The vMUser object class defines attributes that may be useful in providing a voice messaging directory service. All entries having an object class of vMUser may contain any of the attributes vPIMrfc822Mailbox, commonName and spokenName.

This definition can be expanded in the future to include supported capabilities and other multimedia attributes such as vPIMSupportedEncodings (e.g. image/off and audio/32kADPCM) voiceMailTelephoneName, VPIMMaximumMessageSize, dialByName, QoS, etc.

The DIT content rules used for the sub-tree structure in accordance with the invention are shown in Table 3.

TABLE 3

| | Contains Obect Classes | |
|---|---|---|
| DIT Content Rule | Structural | Mandatory |
| vMNodeContentRule | vMNode | vMUser |

DIT Content rules override all other rules for specifying which attributes may appear in an entry. The vMNodeContentRule DIT content rule specifies that the vMNode structural object class and the vMUser auxiliary object class are to be used to define entries to which this content rule applies.

The name forms used in the sub-tree structure in accordance with the invention are shown in Table 4.

TABLE 4

| Name Form | OID | Applies to Object Class | Named by |
|---|---|---|---|
| vMNodeNameForm | id-vpim-nf 1 | vMnode | tc |

Name forms control how entries are named in the directory sub-tree. They are referenced in the DIT structure rules which are used to define which classes of object may be subordinate to other classes of object in the directory. Object classes of the vMNodeNameForm name form are named using the tc attribute type.

The DIT structure rules used in the sub-tree structure in accordance with the invention are shown in Table 5.

TABLE 5

| DIT Structure Rule | Naming Attribute | Superior Rules | Superior Attributes |
|---|---|---|---|
| sr1 | countryName | | |
| sr2 | organizationName | | |
| sr3 | organizationName | sr1 | countryName |
| sr4 | tc | sr2, sr3 | organizationName |
| sr5 | tc | sr4 | tc |

Structure rule 1 defines entries, that are named according to countryNameForm (i.e., named with attribute countryName), to be immediately subordinate to the root of the DIT. Similarly, structure rule 2 defines organizations as also under root.

Structure rule 3 specifies that organization entries can be located under country entries.

Structure rule 4 specifies tc entries placed under organizational entries.

Structure rule 5 defines tc entries subordinate to tc entries.

A search request used to retrieve vPIMrfc822Mailbox, commonName, spokenName and other attribute values, requires specification of a distinguished name (DN) indicating where in the tree the search is to start. If an application process such as VMS recognizes the numbering plan to which a given telephone number belongs, the read can be performed on an entry in the short sub-tree 20 of a DIT similar to that shown in FIG. 4. If the numbering plan is unknown, the long sub-tree 30 must be used (see FIG. 3). Example DNs for telephone number 1-612-765-8385 are:

| | |
|---|---|
| Unknown Numbering Plan | tc = 5, tc = 8, tc = 3, tc = 8, tc = 5, tc = 6, tc = 7, tc = 2, tc = 1, tc = 6, tc = 1, o = VPIM, |
| NANP | tc = 8385, tc = 765, tc = 612, tc = 1, o = VPIM. |

The invention therefore provides a novel tool for permitting application processes to access services on different platforms and in different formats if the telephone number or other numbering plan information of the addressee is known, regardless of the structure of the numbering plan to which the number belongs. This permits considerably broader flexibility in the use of such application processes than was enabled by prior art sub-tree structures.

Changes and modifications of the preferred embodiment described above may become apparent to those skilled in the art. The scope of the invention is therefore intended to be limited solely by the scope of the appended claims.

I claim:

1. A method for structuring a directory to provide a telecommunications service with numbering plan-independent access without search to a directory entry using a unique identifier comprising an alphanumeric sequence associated with the entry, comprising the steps of:

defining a sub-tree in the directory, the sub-tree having a structure in which each character of the unique identifier comprises a separate node in the sub-tree; and each leaf node in the sub-tree stores information about an object that is useful for providing the telecommunications service or said leaf node is assigned an alias which points to information about the object stored somewhere else in a database which stores the entry or points to a different database.

2. A method for structuring a directory to provide a telecommunications service with number plan-independent access without search to a directory entry as claimed in claim 1 wherein the directory is a hierarchically structured directory.

3. A method for structuring a directory to provide a telecommunications service with number plan-independent access without search to a directory entry as claimed in claim 1 wherein the unique identifier is a telephone number.

4. A method for structuring a directory to provide a telecommunications service with number plan-independent access without search to an entry in the directory as claimed in claim 1 wherein the alphanumeric sequence is a calling card number.

5. A method for structuring a directory to provide a telecommunications service with number plan-independent access without search to an entry in the directory as claimed in claim 1 wherein the alphanumeric sequence is a number for life number.

6. A method for structuring a directory to provide a telecommunications service with number plan-independent access without search to an entry in the directory as claimed in claim 3 wherein the alphanumeric sequence is a globally portable telephone number.

7. A method for structuring a directory to provide a telecommunications service with number plan-independent access without search to an entry in the directory as claimed in claim 1 wherein the telecommunications service is a voice messaging service.

8. A method for structuring a directory to provide a telecommunications service with number plan-independent access without search to an entry in the directory as claimed in claim 1 wherein the telecommunications service is an Internet-based service.

9. A method for structuring a directory to provide a telecommunications service with number plan-independent access without search to an entry in the directory as claimed in claim 1 wherein the telecommunications service is a directory assistance service.

10. A method for structuring a directory to provide a telecommunications service with number plan-independent access without search to an entry in the directory as claimed in claim 7 wherein the information about the object that is useful to the telecommunications service is the electronic mail address of the object.

11. A method for structuring a directory to provide numbering plan-independent access without search to a directory entry using a unique identifier associated with the entry, comprising the steps of:

defining a first sub-tree in the directory having a structure in which each character of the unique identifier comprises a separate node in the sub-tree;

defining a second sub-tree in the directory having a structure that resembles a structure of a numbering plan of the unique identifier for an object with which the directory entry is associated; and assigning one or more aliases to each leaf node in the first sub-tree to point to corresponding leaf nodes in the second sub-tree, to permit access to the entry without search using either the first or second sub-tree.

12. The method for structuring a directory to provide numbering plan-independent access without search to a directory entry using a unique identifier associated with the entry as claimed in claim 11 wherein the leaf nodes with the second sub-tree store information about the object that is useful to the telecommunications service or is assigned an alias which points to information about the object stored somewhere else in a database which stores the entry or to a different database.

13. A method for structuring a directory to provide a telecommunications service with number plan-independent access without search to a directory entry as claimed in claim 11 wherein the directory is a hierarchically structured directory.

14. A method for structuring a directory to provide a telecommunications service with number plan-independent access without search to a directory entry as claimed in claim 11 wherein the unique identifier is a telephone number.

15. A method for structuring a directory to provide a telecommunications service with number plan-independent access without search to an entry in the directory as claimed in claim 11 wherein the alphanumeric sequence is a calling card number.

16. A method for structuring a directory to provide a telecommunications service with number plan-independent access without search to an entry in the directory as claimed in claim 11 wherein the alphanumeric sequence is a number for life number.

17. A method for structuring a directory to provide a telecommunications service with number plan-independent access without search to an entry in the directory as claimed in claim 14 wherein the alphanumeric sequence is a globally portable telephone number.

18. A method for structuring a directory to provide a telecommunications service with number plan-independent access without search to an entry in the directory as claimed in claim 11 wherein the telecommunications service is a voice messaging service.

19. A method for structuring a directory to provide a telecommunications service with number plan-independent access without search to an entry in the directory as claimed in claim 11 wherein the telecommunications service is a Internet-based service.

20. A method for structuring a directory to provide a telecommunications service with number plan-independent access without search to an entry in the directory as claimed in claim 11 wherein the telecommunications service is a telephone directory assistance service.

21. A method for structuring a directory to provide a telecommunications service with number plan-independent access without search to an entry in the directory as claimed in claim 16 wherein the information about the object that is useful to the telecommunications service is the electronic mail address of the object.

* * * * *